Dec. 14, 1926.

J. C. THEBERATH

SIZING AND PUNCHING FIXTURE

Filed May 10, 1922

Inventor
Joseph C. Theberath
By
Attorney

Dec. 14, 1926.
J. C. THEBERATH
1,610,982
SIZING AND PUNCHING FIXTURE
Filed May 10, 1922    3 Sheets-Sheet 2
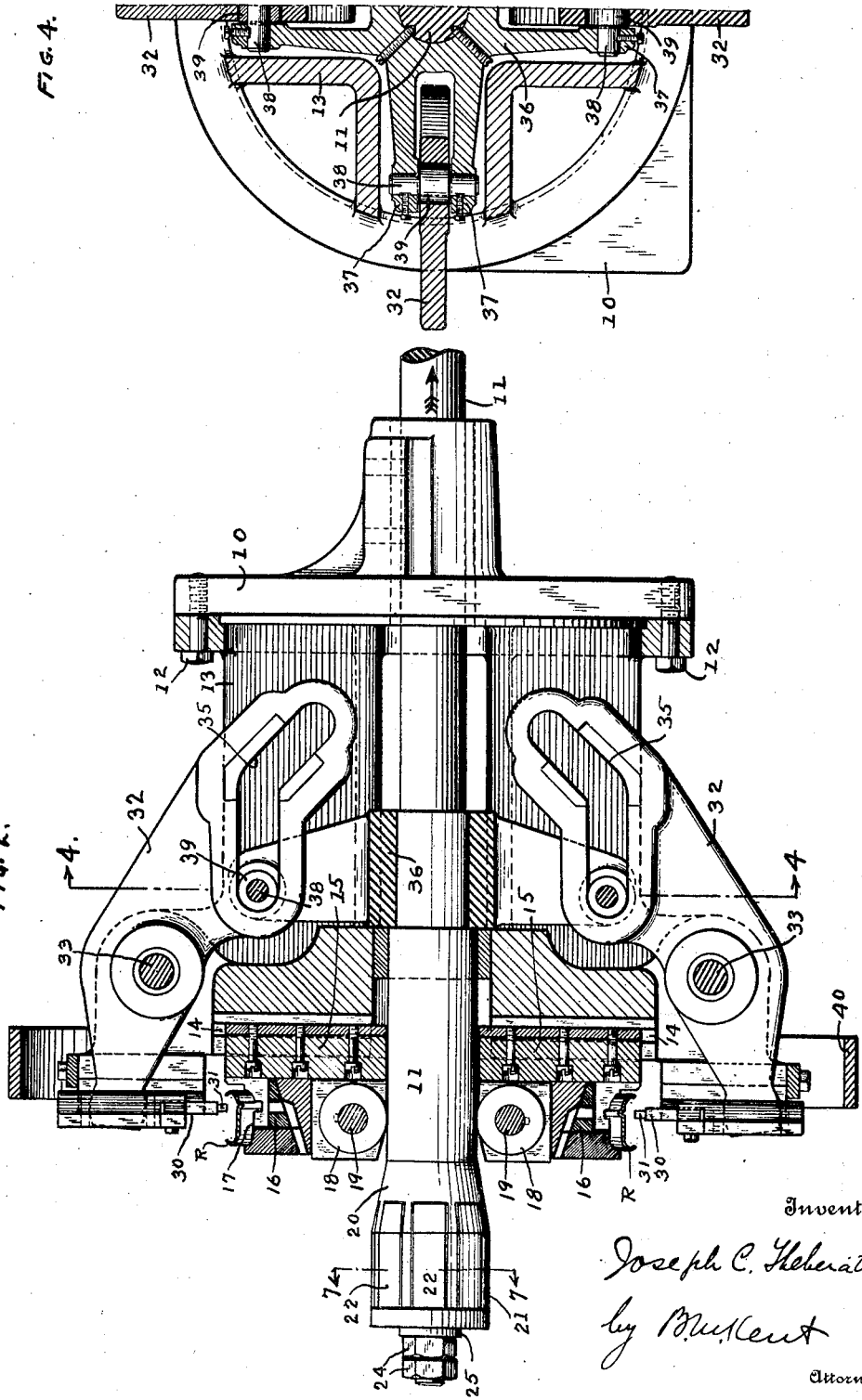

Dec. 14, 1926. 1,610,982
J. C. THEBERATH
SIZING AND PUNCHING FIXTURE
Filed May 10, 1922 3 Sheets-Sheet 3
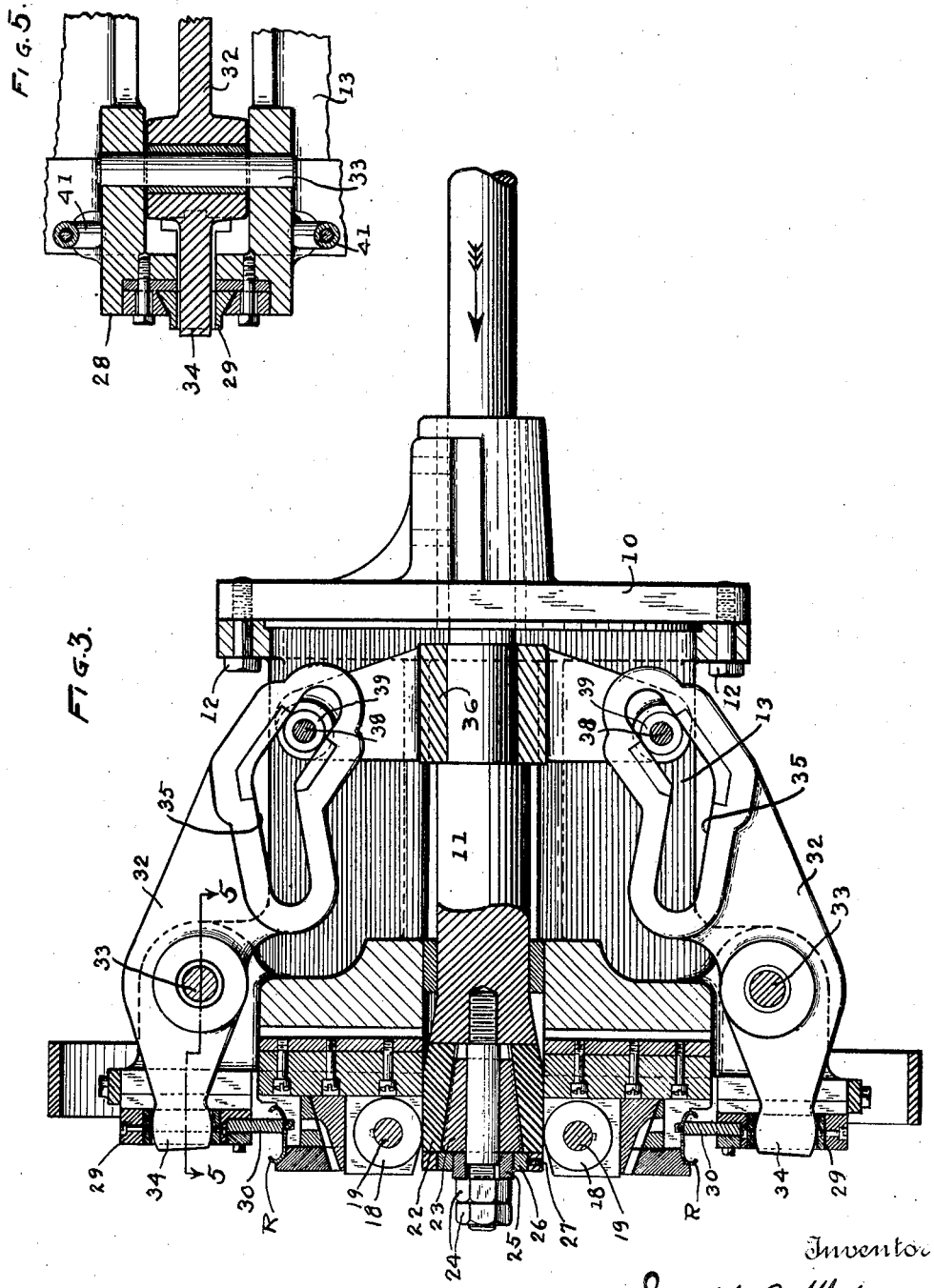

Patented Dec. 14, 1926.

1,610,982

UNITED STATES PATENT OFFICE.

JOSEPH C. THEBERATH, OF CLEVELAND, OHIO, ASSIGNOR, BY MESNE ASSIGNMENTS, TO THE AMERICAN WELDING AND MANUFACTURING COMPANY, OF WARREN, OHIO, A CORPORATION OF OHIO.

SIZING AND PUNCHING FIXTURE.

Application filed May 10, 1922. Serial No. 559,968.

This invention relates to machines especially adapted to size endless bands such as motor vehicle tire rims and to simultaneously punch such holes therein as may be necessary.

It is one of the objects of the invention to provide a comparatively simple machine for this purpose that will be reliable in operation and capable of operating at relatively high speed so as to reduce the cost of the operations performed thereon to a minimum.

Another object of the invention is to provide a machine of this type that is adapted for use in connection with an ordinary bulldozer and, in a sense, act as a special fixture therefor.

Other objects of the invention and the features of novelty will be apparent from the following description taken in connection with the accompanying drawings, of which:

Fig. 2 is a longitudinal section of the same on the line 2—2 of Fig. 1;

Fig. 3 is a view similar to Fig. 2 but showing the parts in a different position;

Fig. 4 is a fragmentary transverse section on the line 4—4 of Fig. 2;

Fig. 5 is a section on the line 5—5 of Fig. 3;

Figure 1:
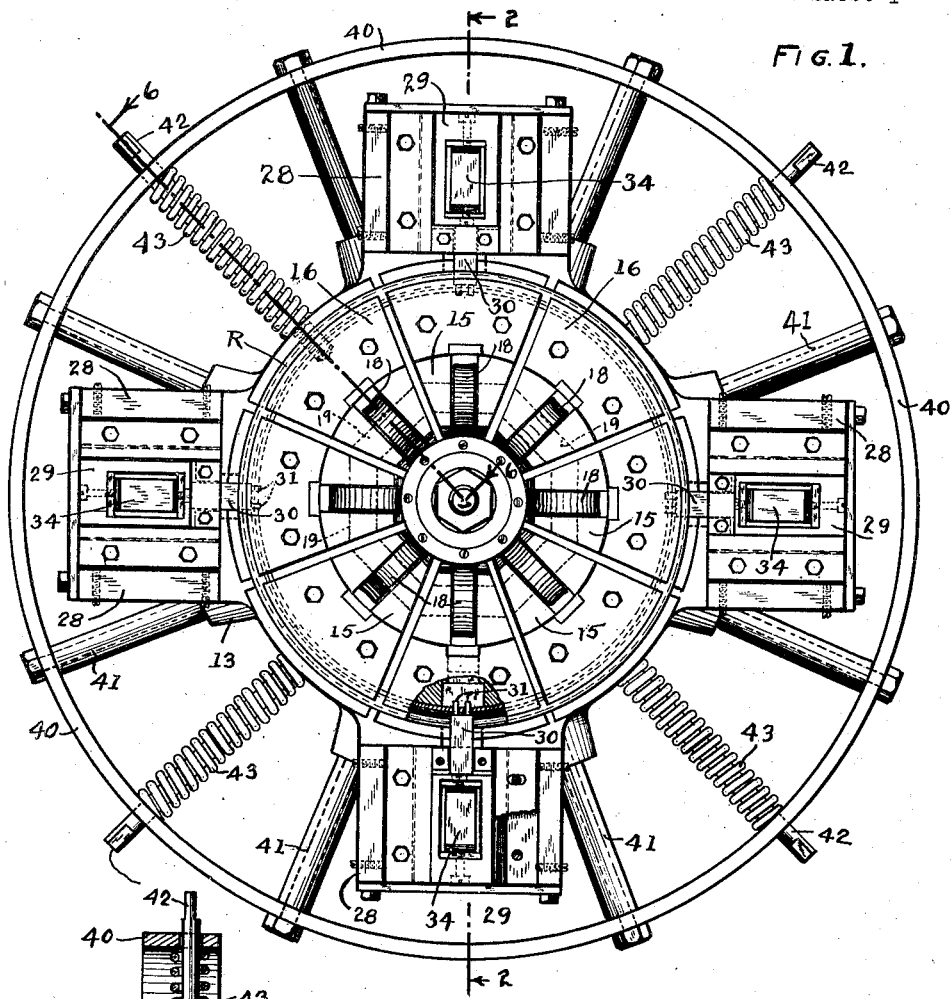
Figure 1 is an end elevation of a machine embodying my invention.

Referring to the drawings 10 indicates a portion of an ordinary bulldozer frame. This bulldozer is of the horizontal type having a reciprocating plunger 11. Since bulldozers of this type are in common use it is believed that a description of the same will be unnecessary.

There is secured to the frame 10, by bolts 12, a frame 13 of the machine embodying my invention. The frame 13 is provided, at its outer end, with radial slots 14 in which the blocks 15 slide. These blocks 15 carry the forming blocks 16 which are shaped, as indicated at 17 in Fig. 2, to conform to the shape of the article which is indicated at R. As will be readily understood from Figs. 1 and 2 the outward radial movement of the blocks 15 will effect an expansion of the rim R and, by carefully regulating the movement of the blocks 15, the amount of the expansion of the rim may be confined to very close limits. This expansion of the rim is what is commonly known as sizing, and the blocks 15 and the parts carried thereby, for accomplishing this result, are hereinafter referred to as the sizing mechanism.

Each of the blocks 15 carries a roller 18 which is rotatably mounted on a shaft 19. These rollers 18 engage with the outer surface of the plunger 11 and the latter is formed with a conical part 20 which, when the rollers 18 traverse it, effects the expansion of the blocks 15. Beyond the conical part 20 of the plunger, there is a cylindrical part 21 so that further axial movement of the plunger 11, after the rollers reach the cylindrical part 21, will not produce further expansion of the blocks 15.

In order to make the amount of the expansion adjustable I have provided, in the part 21 of the plunger 11, radially movable blocks 22, which have tapered inner surfaces for engagement with the axially adjustable cone 23 (see Fig. 3). The cone 23 may be adjusted by means of the nuts 24 to accurately position the blocks 22. In this construction the ring 25 is slidable axially with the cone 23 and serves as a spacer between the nuts 24 and the cone. The ring 26, which surrounds the ring 25, is secured in the end of the plunger 11 by set screws 27 and, to all intents and purposes, constitutes a part of the plunger.

In the form of the invention illustrated, the frame 13 is provided with four radially projecting slideways 28 for the members 29, which carry punches 30 for making openings in the rim R. In the particular case illustrated each punch 30 is adapted to make two openings, as is clearly shown at 31 in Fig. 1. Levers 32, pivotally mounted on shafts 33, carried by the frame 13, have their outer ends 34 in engagement with the members 29 so that the latter will be reciprocated in the slide ways 28 by a rocking movement of the levers 32.

The levers 32 are arranged to rock in radial planes and each is provided with a cam slot 35.

The plunger 11 carries a crosshead 36, which is rigidly secured thereto and is provided with the pairs of arms 37. Each of these pairs of arms carries a shaft 38 on which there is a cam roller 39 that operates in one of the cam slots 35. From Fig. 4 it will be observed how the frame 13 is formed to receive the arms 38 and the levers 32.

In the operation of the machine the plunger 11 starts from the position indicated in Fig. 2 and, in this position, the blocks 16 stand away from the rim R. The plunger 11 is then moved toward the right, as indicated by the arrow in Fig. 2, and the conical portion 20 of the plunger forces the blocks 16 out into engagement with the rim so as to stretch the latter to size. While the rollers 18 are traversing the conical part 20 of the plunger, the rollers 39 are traversing the straight part of the cam slots 35. After the rollers 18 have reached the cylindrical part 21 of the plunger the rollers 39 will enter the inclined portion of the cam slots 35 and, while further movement of the plunger will not produce further expansion of the rim R, such movement of the plunger will cause the levers 32 to be rocked on their shafts 33 and thereby actuate the punches 30, so that by the time the parts assume the position indicated in Fig. 3, the perforations will have been made in the rim and the plunger 11 may then be operated in the reverse direction to restore the parts to the position indicated in Fig. 2 which will release the rim R and permit its removal and the insertion of another rim. It will thus be evident that the machine which I have designed is adapted for simultaneously sizing the rim and while held by the sizing mechanism, to punch such openings in the rim as may be required.

It will be understood that the reciprocation of the plunger 11 is effected by the ordinary bulldozer mechanism and the stroke of the plunger may be regulated to conform to the requirements of the machine illustrated, as will be readily understood by those skilled in the art.

Figure 6:
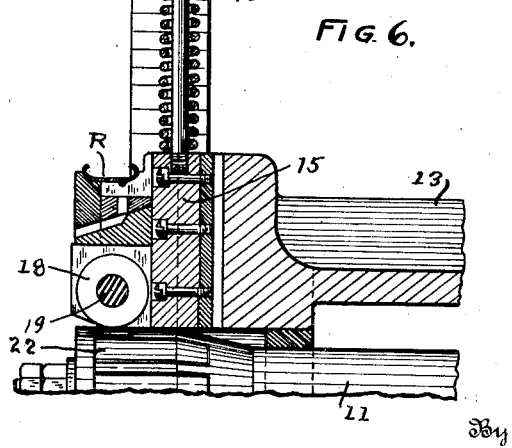
Fig. 6 is a section on the line 6—6 of Fig. 1.
Figure 7:
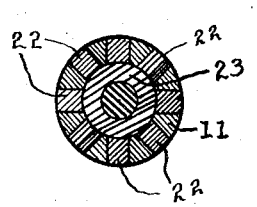
Fig. 7 is a section on the line 7—7 of Fig. 2.

In order to return the blocks 15, after they have been expanded, I have surrounded the sizing mechanism with a ring 40 which is supported on the frame 13 by means of the radially extending bolts 41. Each of the blocks 15 carries a radially extending rod 42, which projects thru an opening therefor in the ring 40 and each of these rods is surrounded by a coil spring 43 which is compressed between the block 15 and the inner surface of the ring 40, as will be seen from Fig. 6, and tends to force the blocks inwardly so that on the return stroke of the plunger 11 the blocks 15 will be restored to their initial position.

While I have illustrated and described what I now consider to be the preferred form of my invention I realize that changes may be made in the details of construction without departing from the spirit of the invention, which is defined in the appended claims.

Having thus described my invention, what I claim is:

1. In a machine of the class described, the combination of a frame, an expansible sizing mechanism on said frame, an axially movable plunger for actuating said mechanism, a lever pivotally mounted on said frame, a punch actuated by said lever, said lever and plunger having cooperative cam means to cause actuation of said lever, said cam means permitting movement of the plunger relative to the lever without actuation of the lever until the sizing mechanism has been substantially completely actuated by the plunger.

2. In a machine of the class described, the combination of a frame, an expansible sizing mechanism on said frame, an axially movable plunger for actuating said mechanism, a plurality of levers pivotally mounted on said frame, a plurality of punches actuated by said levers, said levers and plungers having cooperative cam means to cause actuation of said levers, said cam means permitting movement of the plunger relative to the levers without actuation of the levers until the sizing mechanism has been substantially completely actuated by the plunger.

3. In a machine of the class described, the combination of a frame, an expansible sizing mechanism on said frame, means for actuating said mechanism, a radially movable punch, a lever pivotally mounted on said frame and operatively connected with said punch to actuate the latter, and cooperating cam means on said lever and the first mentioned means whereby said lever is actuated in timed relation to the actuation of said mechanism.

4. In a machine of the class described, the combination of a frame, an expansible sizing mechanism on said frame, means for actuating said mechanism, a plurality of radially movable punches on said frame, levers pivotally mounted on said frame and each operatively connected with one of said punches to actuate the latter, and cooperating cam means on said levers and the first-mentioned means whereby said punches are actuated in timed relation to the actuation of said mechanism.

5. In a machine of the class described, the combination of a frame, an expansible sizing mechanism on said frame, an axially movable plunger for actuating said mechanism, means on said plunger for adjusting the amount of expansion of said mechanism, a radially movable punch cooperating with said mechanism, a lever pivotally mounted on said frame and having one end operatively connected with said punch to actuate the latter, said lever having a cam slot in its opposite end, and means on said plunger cooperating with said cam slot to actuate said lever in timed relation to the actuation of said mechanism.

6. In a machine of the class described, the combination of a frame, an expansible sizing mechanism on said frame, an axially movable plunger for actuating said mechanism, means on said plunger for varying the amount of expansion of said mechanism, a plurality of radially movable punches on said frame, cooperating with said mechanism, a plurality of levers each pivotally mounted on said frame to swing in a radial plane and having an operative connection at one end with one of said punches, and cooperating means on said levers and said plunger whereby said punches are actuated in timed relation to the actuation of said mechanism.

7. In a machine of the class described, the combination of a frame, an expansible sizing mechanism on said frame, an axially movable plunger for actuating said mechanism, a radially movable punch cooperating with said mechanism, a lever pivotally mounted on said frame and having one end operatively connected with said punch to actuate the latter, said lever carrying a cam at its opposite end, and means on the plunger cooperating with said cam to actuate said lever, said cam being shaped to permit actuation of said sizing mechanism by the plunger substantially before actuation of said punch.

In testimony whereof I affix my signature,

JOSEPH C. THEBERATH.